United States Patent
Sebire

(10) Patent No.: US 11,265,789 B2
(45) Date of Patent: Mar. 1, 2022

(54) METHOD AND APPARATUS FOR MANAGING CO-EXISTENCE INTERFERENCE

(75) Inventor: Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 214 days.

(21) Appl. No.: 13/978,892

(22) PCT Filed: Jan. 10, 2011

(86) PCT No.: PCT/EP2011/050204
§ 371 (c)(1),
(2), (4) Date: Aug. 22, 2013

(87) PCT Pub. No.: WO2012/095163
PCT Pub. Date: Jul. 19, 2012

(65) Prior Publication Data
US 2013/0337815 A1    Dec. 19, 2013

(51) Int. Cl.
*H04W 36/00* (2009.01)
*H04W 36/20* (2009.01)

(52) U.S. Cl.
CPC ....... *H04W 36/20* (2013.01); *H04W 36/0055* (2013.01)

(58) Field of Classification Search
CPC ... H04W 72/082; H04W 36/20; H04W 16/14; H04W 36/08; H04W 36/0077; H04B 15/00; H04B 1/1027; H04B 1/10; H04B 1/7097; G01S 7/52015
USPC .......................................... 455/438; 370/338
See application file for complete search history.

(56) References Cited

U.S. PATENT DOCUMENTS

| | | | | |
|---|---|---|---|---|
| 2008/0125124 A1* | 5/2008 | Craig | ................ | H04W 36/0055 455/436 |
| 2008/0268833 A1* | 10/2008 | Huang et al. | ................. | 455/425 |
| 2012/0020231 A1* | 1/2012 | Chen | ..................... | H04W 24/10 370/252 |
| 2012/0040676 A1* | 2/2012 | Jang | ...................... | H04W 36/30 455/436 |
| 2012/0164948 A1* | 6/2012 | Narasimha et al. | ......... | 455/63.1 |
| 2013/0223391 A1* | 8/2013 | Koo | .................. | H04W 72/1215 370/329 |

(Continued)

FOREIGN PATENT DOCUMENTS

WO    WO2006/128948 A1    12/2006

OTHER PUBLICATIONS

3GPP TR 36.816 v1.0.0 (Nov. 2010) "3rd Generation Partnership Project; Technical Specification Group Radio Access Networks; Evolved Universal Terrestrial Radio Access (E-UTRA); Study on signalling and procedure for interference avoidance for in-device coexistence; (Release 10)"; 3rd Generation Partnership Project (3GPP); Mobile Competence Centre: 650, Route des Lucioles; F-06921 Sophia-Antipolis Cedex; France: pp. 1-34.

(Continued)

*Primary Examiner* — Marcos Batista
(74) *Attorney, Agent, or Firm* — Harrington & Smith

(57) ABSTRACT

A method includes determining if a user equipment is to be handed over to a target radio access node and if said user equipment suffers co-existence interference, and providing a message to be sent to said target radio access node, said message including interference information indicating that said user equipment suffers co-existence interference.

16 Claims, 5 Drawing Sheets

(56) References Cited

U.S. PATENT DOCUMENTS

2013/0242919 A1* 9/2013 Koo ............... H04W 72/1215
                                              370/329
2014/0031036 A1* 1/2014 Koo ................. H04W 36/20
                                              455/434
2015/0131558 A1* 5/2015 Van Lieshout et al. ..................
                                              H04W 24/10
                                              370/329

OTHER PUBLICATIONS

IEEE Std 802.11-2007 (Revision of IEEE Std 802.11-1999) "IEEE Standard for Information Technology—Telecommunications and information exchange between systems—Local and metropolitan area networks—Specific requirements; Part 11: Wireless LAN Medium Access Control (MAC) and Physical Layer (PHY) Specifications" Sponsor LAN/MAN Committee of the IEEE Computer Society; Approved Mar. 8, 2007; IEEE-SA Standards Board; IEEE; 3 Park Avenue; New York; NY 10016-5997; USA; pp. 1-1076 (uploaded in 2 parts).

3GPP TSG RAN WG2 Meeting #71, Madrid, Spain, Aug. 23-27, 2010; "Problem Scenarios and Proposed Solutions for In-device Coexistence"; R2-104910; 3 pgs.

CATT; "FDM-based Approach for In-device Coexistence Interference"; R2-105336; 3GPP TSG RAN WG2 Meeting #71bis; Xi'an, China; Oct. 11-15, 2010; whole document (2 pages).

* cited by examiner

METHOD AND APPARATUS FOR MANAGING CO-EXISTENCE INTERFERENCE

Embodiments relate to a method and apparatus where a user equipment suffers coexistence interference.

Communication between two or more entities such as mobile communication devices and other stations can be facilitated by a communication system. A communication system and compatible communication devices typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. In wireless systems a communication device thus typically provides a transceiver station that can communicate with the access node and/or another communications device. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B.

A communication system can be accessed by means of an appropriate communication device. A communication device of a user is often referred to as user equipment (UE). A communication device is provided with an appropriate signal receiving and transmitting arrangement for enabling communications with other parties. A feature of wireless communication devices is that they offer mobility for the users thereof. A mobile communication device, or mobile device for short, may also be transferred, or handed over, from a base station to another and even between base stations belonging to different systems.

According to an embodiment, there is provided a method comprising: determining if a user equipment is to be handed over to a target radio access node and if said user equipment suffers co-existence interference; and providing a message to be sent to said target radio access node, said message comprising interference information indicating that said user equipment suffers co-existence interference.

The method may comprise transmitting said message to said target radio access node.

According to another embodiment, there is provided a method comprising: obtaining from a message from a source radio access node, interference information indicating that a user equipment to be handed over has co-existence interference; and controlling, in dependence on said interference information, a frequency of said user equipment when said user equipment has been handed over to avoid said co-existence interference The method may comprise receiving said message from said source radio access node.

It should be appreciated that the features mentioned below may be used on combination with one or other or both of the above embodiments.

The message may comprise a handover request. The message may be any other suitable message in other embodiments. In some embodiments, the interference information may be provided by a plurality of messages.

The interference information may comprise information indicating that co-existence interference is a reason for handover.

The interference information may be provided in a cause field. In some embodiments the interference information is provided in a different field. In some embodiments the interference information may be provided in more than one field.

The method may comprise providing frequency information about a frequency on which co-existence interference occurs. The frequency information may comprise comprises information about a source frequency. The frequency information may comprise source downlink carrier frequency information. The frequency information may be provided in the same message or a different message to that providing the interference information.

The method may comprise providing target frequency information. The target frequency information may comprise target cell information. The target frequency information may be provided in the same message or a different message to that providing the interference information and/or the frequency information.

The co-existence interference may be the interference of cellular wireless communication of the user equipment with one or more other frequency. The other frequency comprises at least one of a global navigation frequency and industrial, scientific and medical ISM frequency.

The method may comprise providing a message comprising additional information about one or more of: problematic frequencies and interfering radio technologies. The additional information may be provided in a plurality of messages.

The additional information may be in one or more information element of said message. Alternatively, the additional information may be provided in any other suitable field of the message.

The additional information may be in one or more of: user equipment context information; radio resource control context of user equipment context information; handover restriction information list of user equipment context information; and user equipment history information.

The additional information and interference information may be in the same message or in different messages.

According to another embodiment, there is provided an apparatus comprising at least one processor, and at least one memory including computer program code, wherein the at least one memory and the computer program code are configured, with the at least one processor, to: determine if a user equipment is to be handed over to a target radio access node and if said user equipment suffers co-existence interference; and provide a message to be sent to said target radio access node, said message comprising interference information indicating that said user equipment suffers co-existence interference.

The apparatus may comprise a transmitter configured to transmit said message to said target radio access node.

According to another embodiment there is provided an apparatus comprising at least one processor, and at least one memory including computer program code, wherein the at least one memory and the computer program code are configured, with the at least one processor, to: obtain from a message from a source radio access node, interference information indicating that a user equipment to be handed over has co-existence interference; and control, in dependence on said interference information, a frequency of said user equipment when said user equipment has been handed over to avoid said co-existence interference The apparatus may comprise a receiver configured to receive said message from said source radio access node.

It should be appreciated that the features mentioned below may be used on combination with one or other or both of the above apparatus embodiments.

The message may comprise a handover request.

The interference information may comprise information indicating that co-existence interference is a reason for handover.

The interference information may be provided in a cause field.

The at least one memory and the computer program code may be configured, with the at least one processor, to provide frequency information about a frequency on which co-existence interference occurs.

The frequency information may comprise information about a source frequency.

The frequency information may comprise source downlink carrier frequency information The at least one memory and the computer program code may be configured, with the at least one processor, to provide target frequency information.

The target frequency information may comprise target cell information

The co-existence interference may be interference of cellular wireless communication of the user equipment with one or more other frequency.

The other frequency may comprise at least one of a global navigation frequency and ISM frequency.

The at least one memory and the computer program code may be-configured, with the at least one processor, to provide a message comprising additional information about one or more of: problematic frequencies and interfering radio technologies.

The additional information may be in one or more information element of said message.

The additional information may be in one or more of: user equipment context information; radio resource control context of user equipment context information; handover restriction information list of user equipment context information; and user equipment history information.

The additional information and interference information may be in the same message.

A source radio access node or a target radio access node may comprise the apparatus discussed above.

A computer program comprising program code means adapted to perform the herein described methods may also be provided. In accordance with further embodiments apparatus and/or computer program product that can be embodied on a computer readable medium for providing at least one of the above methods may be provided.

Various other aspects and further embodiments are also described in the following detailed description of examples and in the attached claims.

For a better understanding of some embodiments of the invention, reference will be made by way of example only to the accompanying drawings in which:

FIG. 1 schematically shows part of a communications network;

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 to 3 to assist in understanding of the herein described embodiments.

Figure 1:
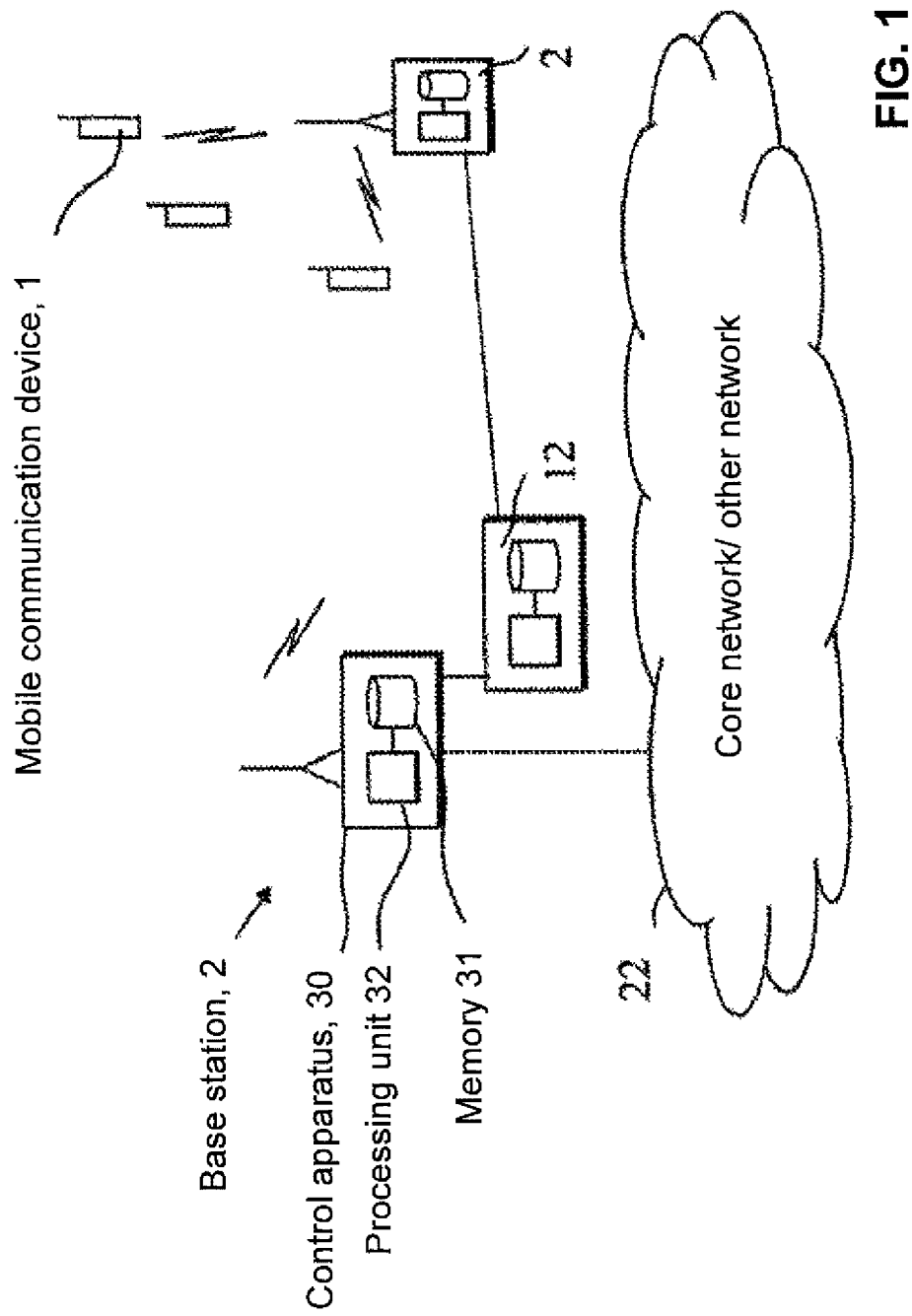

In a mobile system a user can be provided with a mobile communication device 1 that can be used for accessing various services and/or applications. The access can be provided via an access interface between the mobile user device 1 and an appropriate wireless access system, for example an access node. An access node can be provided by a base station. FIG. 1 shows part of a radio access network (RAN), including a first base station 2 and a second base station 2. The term base station will be used in the following and is intended to include the use of any of these access nodes or any other suitable access node. The base stations each have a cell associated therewith. The access system also comprises a mobility management entity (MME) 12. The mobile management entity 12 and the base stations can be connected, for example, by means of a S1 interface.

Although not shown, a gateway function between the access systems, a core network 22 and/or another network such as the packet data network may also be provided by means of appropriate gateway nodes. Regardless of the gateway arrangement, a communication device can be connected to an external data network, for example the internet via the access nodes and the base station.

The mobile communication devices can access the communication system based on various access techniques, such as code division multiple access (CDMA), or wideband CDMA (WCDMA), the latter technique being used by some communication systems based on the third Generation Partnership Project (3GPP) specifications. For LTE (long term evolution) and LTE-A (long term evolution—advanced), OFDMA (Orthogonal Frequency Division Multiplexing) in the DL (down link) and single-carrier FDMA in the UL (uplink) can be used. Other examples include time division multiple access (TDMA), frequency division multiple access (FDMA), space division multiple access (SDMA) and so on. In a wireless system a network entity such as a base station provides an access node for communication devices.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB (NB) or enhanced NodeB (eNB) in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

Regardless of the underlying standard, a mobile communication device can be provided wireless access via at least one base station or similar wireless transceiver node of an access system. An access system may be provided by a cell of a cellular system or another radio service area enabling a communication device to access a communication system.

Therefore an access system is hereinafter referred to as a radio service area or cell. Typically a cell is provided by a base station site. A base station site can provide a plurality of sectors, for example three radio sectors, each sector providing a cell or a sub radio service area of a cell.

Figure 2:
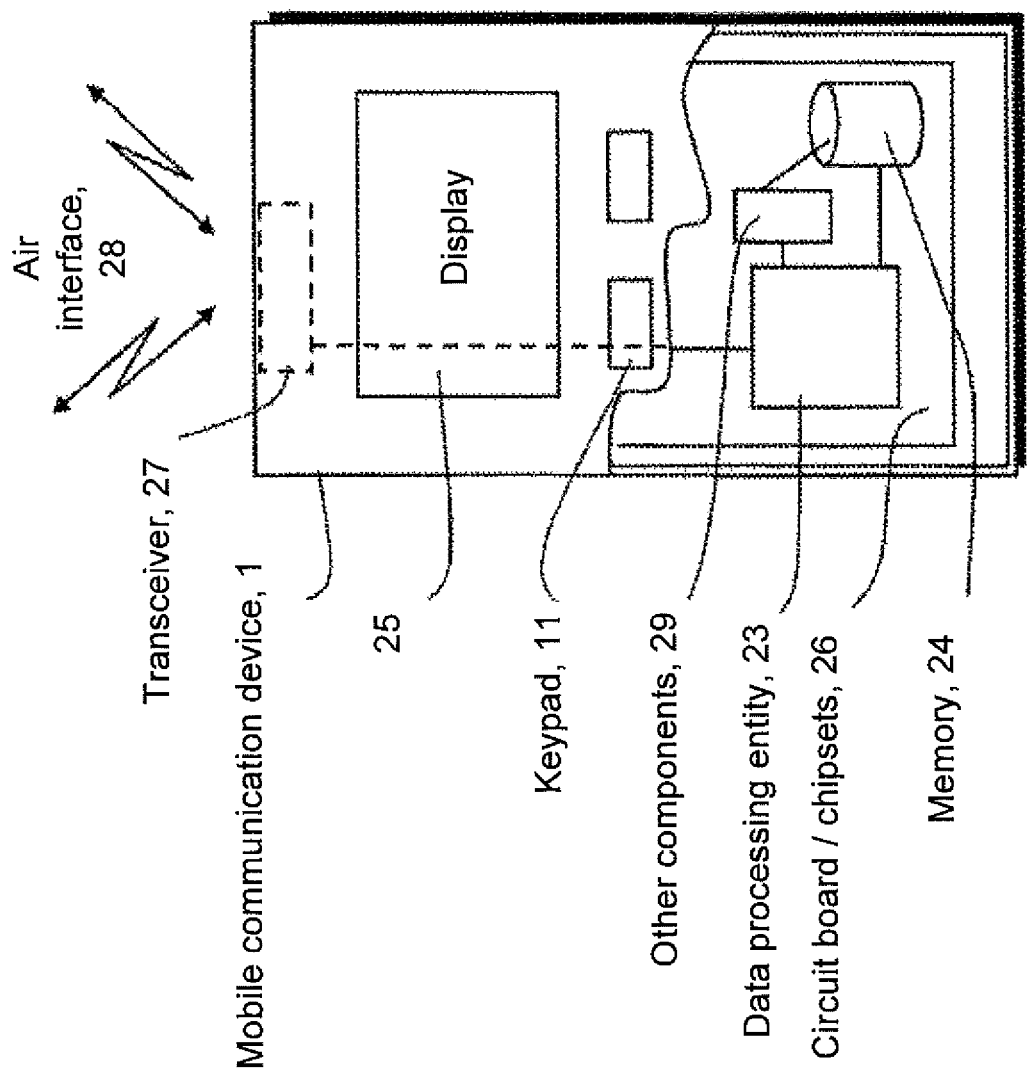
FIG. 2 shows an example of a communication device.

FIG. 2 shows a schematic, partially sectioned view of a communication device 1 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile communication device 1 may receive and transmit signals over an air interface 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device.

A mobile communication device is also typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Possible control functions in view of configuring the mobile communication device for reception and/or transmission of signalling information and data by means of the data processing facility in accordance with certain embodiments of the present invention will be described later in this description.

The user may control the operation of a communication device by means of a suitable user interface such as keypad 11, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

Figure 3:
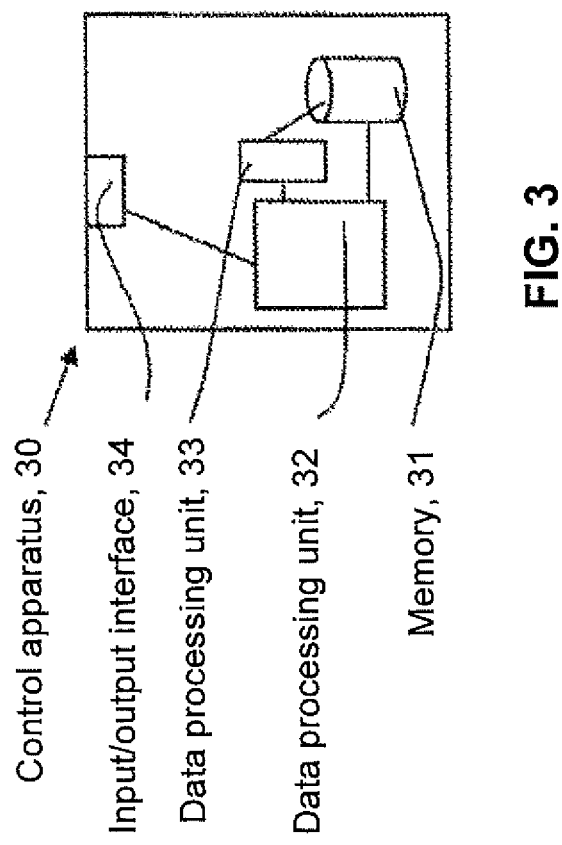
FIG. 3 shows an example of controller apparatus for a base station.

FIG. 3 shows an example of a control apparatus 30, for example to be coupled to a base station and/or part of the base station itself. The control apparatus 30 can be arranged to provide control on use of resources for communications by mobile communication devices that are in the service area. The control apparatus 30 can be configured to provide control functions in association with generation and communication of resource allocation information and other related information and for coordination of resource allocation for signalling and data communications by means of the data processing facility in accordance with certain embodiments described below. For this purpose the control apparatus 30 comprises at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

Figure 5:
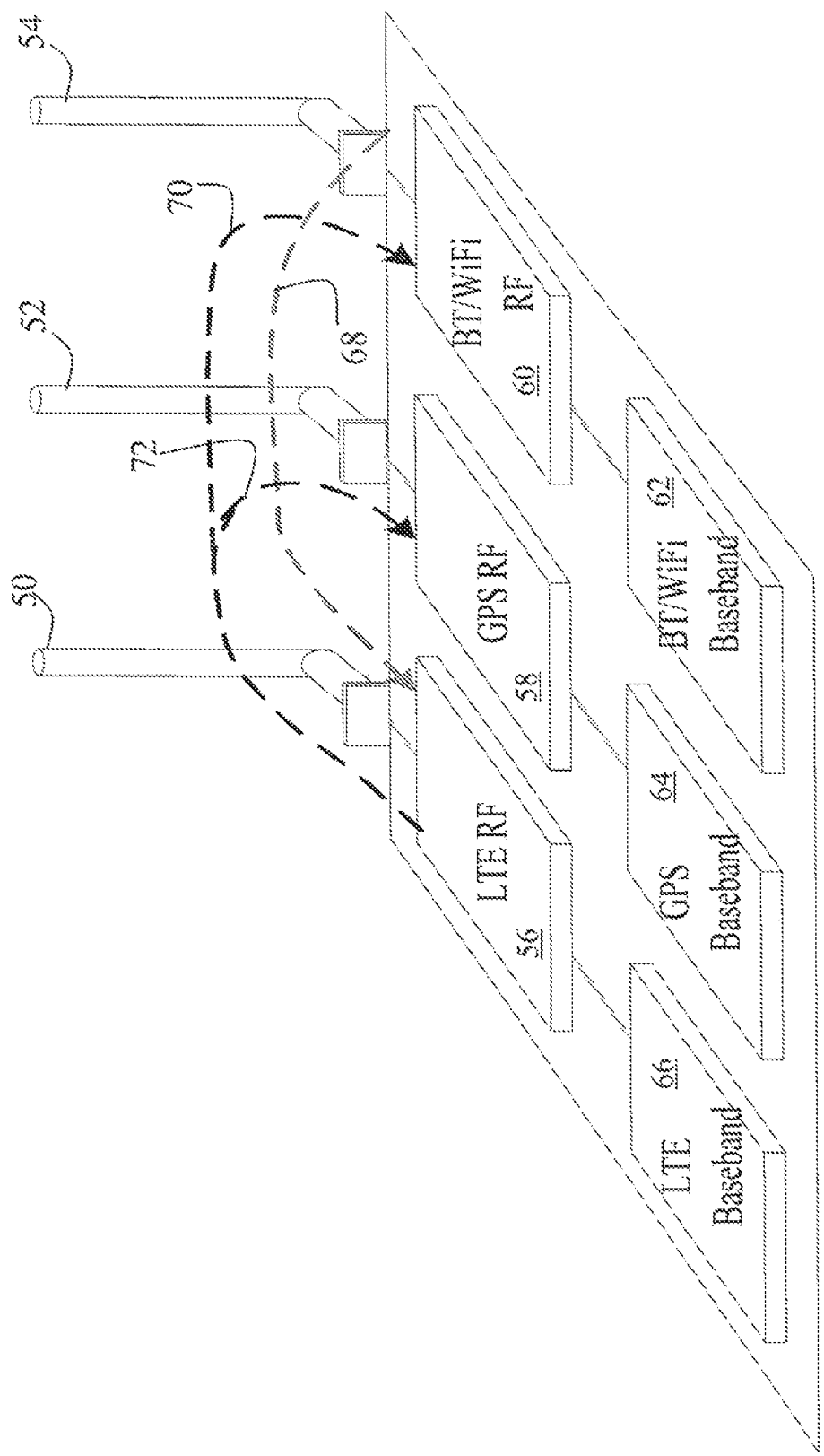
FIG. 5 shows a communication device with three transceivers.

Reference is made to FIG. 5 which shows part of the device 1 in more detail. In this example, the device 1 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth and/or Wi-Fi signals. These latter signals are referred to as ISM (industrial, scientific and medical) signals. This is in order to allow the device to access various networks and services.

The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth/Wi-Fi radio frequency processor 60 which in turn is connected to the Bluetooth/Wi-Fi baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing.

In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas.

It should be appreciated that in some embodiments, the GPS blocks may only need to receive signals.

It is possible that when LTE and ISM (which includes Bluetooth and WLAN technology) capabilities are provided in a single device, the LTE and ISM radio within the same device may be working on adjacent frequencies. For example, the LTE may be working on the upper part of band 40 (2300-2400 MHz) and the ISM may be working in the example 2450 MHz band. This type of coexistence may cause interference. In some scenarios, the filtering technology is such that it is difficult to provide a terminal filter with sufficient rejection on the adjacent frequencies. This interference between the LTE frequencies and the Bluetooth/Wi-Fi frequencies is schematically shown in FIG. 5 by arrows 68 and 70.

With the rapid increase in the number and types of GPS systems, such as GPS, A-GPS (assisted global navigation satellite system) and COMPASS, the spectrum allocation to the services is increasing. When LTE and GPS radio capabilities are provided within the same device, this may cause interference due to the adjacent operation or harmonics. This may be difficult to avoid with the allocation of a guard band at the sub-harmonic frequency. It has been suggested that the guard band requires double the GPS carrier bandwidth which may impact on large GPS bandwidth systems particularly such as A-GNSS and COMPASS as well GPS. The interference between the LTE and GPS systems is schematically shown by arrow 72 in FIG. 5.

Reference is made to the 3GPP specification 36.816 which has the objective to investigate suitable mechanisms for facilitating the coexistence scenario that LTE and GPS/ISM radio are within the same device working in adjacent frequencies or sub-harmonic frequencies.

Currently, some mechanisms have been suggested in LTE which could be utilised to detect and avoid interference such as RSRQ (reference signal received quality) measurement, interfrequency/inter-RAT (radio access technology) handover, cell selection or reselection, RLF (Radio Link Failure) monitoring and connection reestablishment.

Thus, in a communication device which is necessarily small, the different radio transceivers are arranged relatively close to one another. Accordingly, the transmit power of one transmitter may be much higher than the received power of another receiver. Generally, by means of filter technologies and sufficient frequency separation, the transmit signal may not result in significant interference to a received signal. However, for some of the coexistence scenarios where different radio technologies are supported within the same user equipment and operating on adjacent frequencies, current filter technology might not provide sufficient rejection. In some UEs, a single generic RF design may be used. However, in some scenarios, alternative methods are used.

In some embodiments, the communication device in the case of LTE interference will be aware of the cause of the interference. In other words, the communication device will know that the activation of the ISM and/or GPS device is the source of the interference. Accordingly, in some embodiments, the communication device is able to use this information in order to mitigate or avoid the interference.

It has been proposed that the user equipment inform the E-UTRAN when transmission/reception of LTE and/or other radio signals would benefit or no longer benefit from LTE not using certain carriers or frequency resources. The user equipment judgement may be taken as a baseline approach for frequency domain multiplexing where the user equipment indicates which frequencies are and/or not usable due to in-device interference. In response to such signalling, the eNodeB may order the user equipment to perform a handover to a frequency that has not been reported by the user equipment as suffering from in-device coexistence interference.

However, where the user equipment is being handed over to a target eNodeB, the target eNodeB may not be aware as to why the handover is being performed. However, if the target eNB is not aware of the reason as to why handover is performed, that target eNB may decide to move the user equipment back to the problematic frequency for the LTE communication. This problem may be referred to as a ping-pong effect.

It has been suggested that the UE be asked to report more information. For example, the UE may need to signal a long list of parameters from the user equipment to the target eNB. However, this may increase the overhead as the information needs to be provided to every new cell when the user equipment is ordered to perform a handover. This information may not assist in the handover preparation phase when the source eNB contacts the target eNodeB.

In one embodiment, to avoid ping-pong on frequencies suffering from in-device coexistence interference, the HANDOVER REQUEST message exchanged between the source and target eNBs during the handover preparation includes in a cause field the reason for performing a handover is in-device coexistence interference. Currently the HANDOVER REQUEST has a cause field. In one embodiment, an in-device coexistence interference cause is available to be provided in the cause field The HANDOVER REQUEST is sent by the source eNB to the target eNB in order to initiate the handover request. This HANDOVER REQUEST will include the handover cause as being in-device co-existence interference.

From the HANDOVER REQUEST message, the target eNB is able to identify the frequency which the user equipment currently uses. This will be the LTE frequency and may be one or more of the receiving frequency and the transmitting frequency. The receiving and transmitting frequencies may be the same or different. The target eNB is able to identify the frequency selected as the handover candidate. This is the LTE frequency and may be one or more of the receiving frequency and the transmitting frequency. Again the target transmitting and receiving frequencies may be the same or different.

This information is provided from the source downlink/carrier frequency information of the RRC context (current frequency) and the target cell ID (target frequency) respectively. If the cause information indicates that the cause of the handover is in-device co-existence interference, the target eNB is therefore able to know that the source frequency (at the source eNB) suffers from in-device coexistence interference while the new target frequency selected by the source eNB and/or UE does not. The target eNB uses this information when managing its own resources and would tend to avoid moving the user equipment back to a problematic frequency.

In some embodiments, the scenarios where in-device coexistence interference can cause problems are well defined:

Case 1: LTE band 40 radio transmission (2300-2400 MHz) causing interference to ISM radio reception (Bluetooth—2450 MHz and IEEE 802.11/Wi-Fi—2450 MHz).

Case 2: ISM radio transmission causing interference to LTE band 40 radio reception (the relevant frequencies are as in Case 1).

Case 3: LTE band 7 (2500 MHz-2570 MHz) radio transmission causing interference to ISM radio reception at the frequencies mentioned previously.

Case 4: The user equipment is transmitting on LTE band 7, 13 or 14. As mentioned previously, band 7 is 2500 MHz to 2570 MHz, band 13 is 777 MHz to 787 MHz and band 14 is 788 MHz to 798 MHz. This may cause interference to the GNSS radio reception. Depending on the satellite system, the frequency ranges are from about 1.2 GHz to about 1.6

GHz. Typically, the interference will be caused by frequency harmonics. As long as the user equipment does not report any new information, the target eNB, which is now the controlling eNB will generally avoid sending the user equipment onto a problematic LTE frequency band.

In one modification, further information could be provided. For example, a list of problematic frequencies and/or affected technologies such as WLAN, BT or GNSS may be sent. This information can be sent in any suitable message. By way of example, such information could be sent in: a new information element in UE context information of the HANDOVER REQUEST message; as a new information element in an RRC context of UE context information of the HANDOVER REQUEST, (for example handover preparation information); as a new information element in the handover restriction list of user element context information of the HANDOVER REQUEST; and/or as a new information element in a UE history information of the HANDOVER REQUEST.

Figure 4:
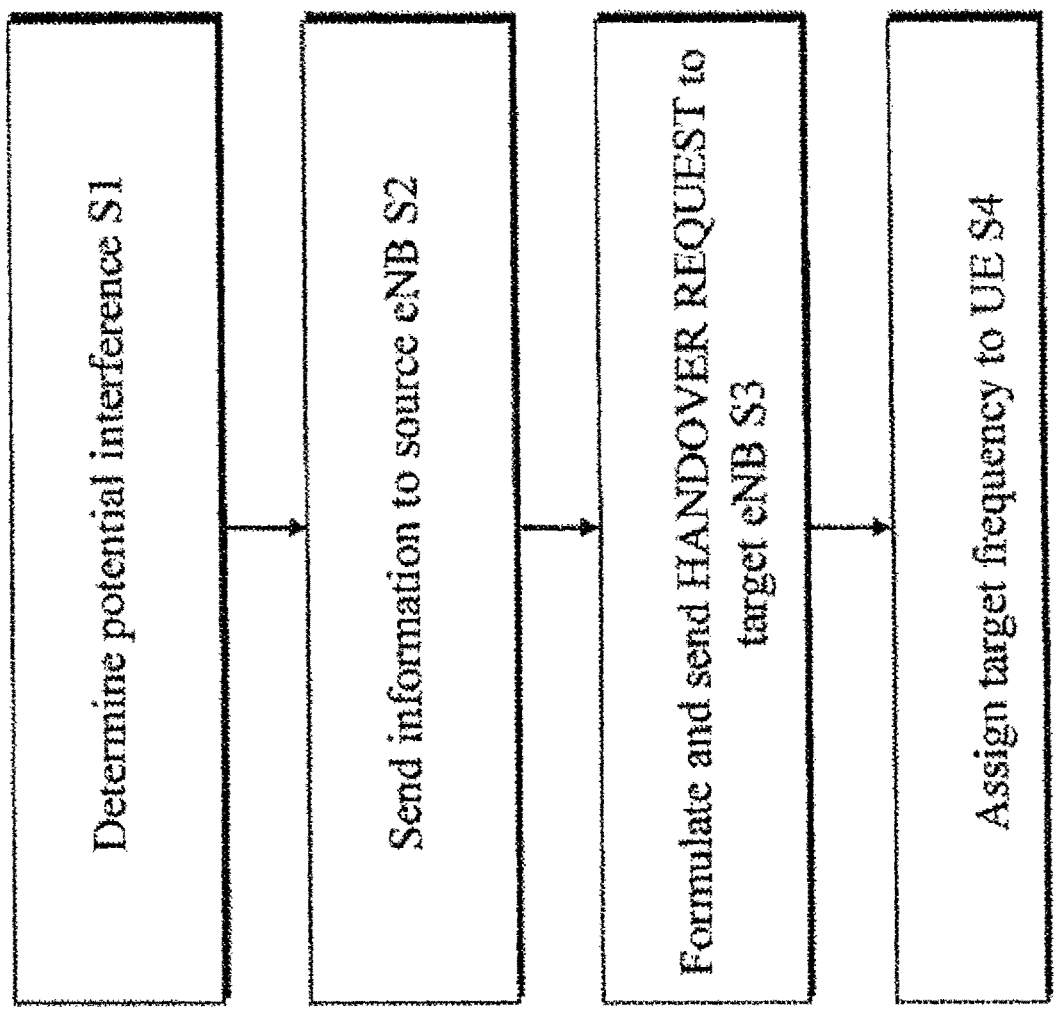
FIG. 4 is flowchart illustrating an embodiment.

A method of an embodiment will now be explained with reference to FIG. 4. In step S1, the user equipment is configured to determine that there is a potential interference issue. This can be done from the user equipment checking if the LTE reception/transmission frequency is one which potentially conflicts with the GNSS frequency and/or the BT/Wi-Fi frequency. This information may be pre-stored on the user equipment or may be supplied to the user equipment from time-to-time by, for example the eNB. In one embodiment of the present invention, the user equipment will alternatively or additionally determine that there is an interference problem, only if the respective interfering receivers are both switched on. In alternative embodiments, a determination is made regardless as to whether or not the respective functionality is turned on or off. Alternatively or additionally, the user equipment may perform quality of service measurements with respect to received signals in order to determine if any of the transmitting signals are potentially causing interference.

In step S2, the user equipment is configured to send information to the source eNodeB. This information can take any suitable form and in one embodiment, the user equipment provides information as to which frequencies are and/or are not usable due to in-device interference. In another embodiment, the user equipment may send information indicating what receivers the device has. From this information, the eNodeB determines which frequencies are suitable for use with the user equipment.

In step S3, the source eNB is configured to formulate and send a HANDOVER REQUEST to the target eNB including the cause information previously mentioned. Optionally, if further information is required, that additional information may be included in any other suitable field in the HANDOVER REQUEST such as outlined previously.

In step S4, the eNB is configured to allocate the frequency selected as the handover candidate to the user equipment, whilst the user equipment is handed over to the target eNB. The target eNB will use the information provided in the HANDOVER REQUEST to avoid allocating the user equipment to a frequency where in-device coexistence interference may be a problem.

It should be appreciated that in some embodiments, there may only be two different receivers which interfere with one another. In alternative embodiments, more than three such devices may be provided. The various different frequency bands are given by way of example only and other embodiments may have different or additional interfering frequencies.

The required data processing apparatus and functions of a base station apparatus, a communication device, a relay, and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

It is noted that whilst embodiments have been described in relation to communications system such as those based on the LTE-Advanced (LTE-A) systems and 3GPP based systems, similar principles can be applied to other communication systems. Non-limiting examples of other communication systems include those based on the WCDMA and HSPA. Therefore, although certain embodiments were described above by way of example with reference to certain exemplifying architectures for wireless networks, technologies and standards, embodiments may be applied to any other suitable forms of communication systems than those illustrated and described herein. For example the eNB may be replaced in other embodiments by any suitable radio access node.

Reference has been made to the HANDOVER REQUEST message. It should be appreciated that any other suitable message may be used to provide the information. More than one message may be used to provide the required information from the source access node to the target radio access node.

It should be appreciated that the interference scenarios give are by way of example and there may be additional and/or alternative interference scenarios between the different radio technologies.

It should be noted that different embodiments have been described. It should be appreciated that two or more embodiments or parts of two or more embodiments may be combined.

It is also noted herein that while the above describes exemplifying embodiments of the invention, there are several variations and modifications which may be made to the disclosed solution without departing from the spirit and scope of the present invention.

The invention claimed is:
1. A method comprising:
receiving, at a source radio access node, information from a user equipment that the user equipment has a potential in-device co-existence interference issue, said information identifying what receivers the user equipment has related to the potential in-device co-existence interference issue;
determining, by the source radio access node, that the user equipment is to be handed over to a target radio access node;

determining, by the source radio access node based on the identified receivers, which frequencies are frequencies usable by the user equipment because of the potential in-device co-existence interference issue;

formulating, by the source radio access node, a handover request message to the target radio access node with said information identifying frequencies usable by the user equipment because of the potential in-device co-existence interference issue; and sending, by the source radio access node, the handover request message to said target radio access node.

2. The method as claimed in claim 1, comprising further providing frequency information about a frequency on which co-existence interference occurs.

3. The method as claimed in claim 1, further comprising providing a message comprising additional information about problematic frequencies.

4. A computer program product comprising a non-transitory computer-readable storage medium bearing computer program code embodied therein for use with a computer, the computer program code comprising code for performing the method according to claim 1.

5. The method as claimed in claim 1, further comprising providing a message comprising additional information about affected radio technologies.

6. A method comprising:

receive, at a target radio access node, a handover request message from a source radio access node, said handover request message including information identifying frequencies usable by a user equipment to be handed over because of a potential in-device co-existence interference issue for the user equipment, wherein the identified frequencies were identified by the source radio access node based on identified receivers received from the user equipment; and allocating by the target radio access node to the user equipment, based on said information identifying frequencies not usable by the user equipment because of the potential in-device co-existence interference issue, a frequency not among the frequencies not usable by the user equipment to avoid the potential in-device co-existence interference issue when the user equipment has been handed over to the target radio access node and to avoid a ping-pong effect.

7. A computer program product comprising a non-transitory computer-readable storage medium bearing computer program code embodied therein for use with a computer, the computer program code comprising code for performing the method according to claim 6.

8. An apparatus comprising:
at least one processor; and
at least one memory including computer program code, wherein the at least one memory and the computer program code are configured, with the at least one processor, to:

receive, at a source radio access node, information from a user equipment that the user equipment has a potential in-device co-existence interference issue, said information identifying what receivers the user equipment has related to the potential in-device co-existence interference issue;

determine, by the source radio access node, that the user equipment is to be handed over to a target radio access node;

determine, by the source radio access node based on the identified receivers, which frequencies are frequencies usable by the user equipment because of the potential in-device co-existence interference issue, formulate, by the source radio access node, a handover request message to the target radio access node with said information identifying frequencies usable by the user equipment because of the potential in-device co-existence interference issue; and send, by the source radio access node, the handover request message to said target radio access node.

9. The apparatus as claimed in claim 8, further comprising a transmitter configured to transmit said message to said target radio access node.

10. The apparatus as claimed in claim 8, wherein the at least one memory and the computer program code are further configured, with the at least one processor, to provide frequency information about a frequency on which co-existence interference occurs.

11. The apparatus as claimed in claim 8, wherein the at least one memory and the computer program code are further configured, with the at least one processor, to provide a message comprising additional information about one or more of: problematic frequencies and interfering radio technologies.

12. A source radio access node comprising the apparatus as claimed in claim 8.

13. An apparatus comprising:
at least one processor; and
at least one memory including computer program code, wherein the at least one memory and the computer program code are configured, with the at least one processor, to:

receive, at a target radio access node, a handover request message from a source radio access node, said handover request message including information identifying frequencies not usable by a user equipment to be handed over because of a potential in-device co-existence interference issue for the user equipment, wherein the identified frequencies were identified by the source radio access node based on receivers identified as being in the user equipment and related to the potential in-device co-existence interference issue; and allocate by the target radio access node to the user equipment, based on said information identifying frequencies not usable by the user equipment because of the potential in-device co-existence interference issue, a frequency not among the frequencies not usable by the user equipment to avoid the potential in-device co-existence interference issue when the user equipment has been handed over to the target radio access node and to avoid a ping-pong effect.

14. The apparatus as claimed in claim 13, further comprising a receiver configured to receive said message from said source radio access node.

15. A target radio access node comprising the apparatus of claim 13.

16. An apparatus comprising:
at least one processor; and
at least one memory including computer program code, wherein the at least one memory and the computer program code are configured, with the at least one processor, to:

determine that a user equipment has a potential in-device co-existence interference issue when communicating with a radio access node;

identify what receivers the user equipment has related to the potential in-device co-existence interference issue; and send, to the radio access node, information identifying the receivers to indicate the potential in-device co-existence interference issue and for use by the radio access node to generate a handover request message to another radio access node.

* * * * *